United States Patent [19]

Barten

[11] Patent Number: 4,744,254

[45] Date of Patent: May 17, 1988

[54] FORCE MEASURING DEVICE

[75] Inventor: Hans Barten, Friedberg, Fed. Rep. of Germany

[73] Assignee: Pfister GmbH, Augsburg, Fed. Rep. of Germany

[21] Appl. No.: 941,213

[22] Filed: Dec. 12, 1986

[30] Foreign Application Priority Data

Dec. 18, 1985 [DE] Fed. Rep. of Germany ....... 3544885

[51] Int. Cl.$^4$ .............................................. G01L 1/26
[52] U.S. Cl. .................................. 73/862.66; 177/211; 177/DIG. 9
[58] Field of Search ........................ 73/862.65, 862.66; 177/211, DIG. 9, 134

[56] References Cited

U.S. PATENT DOCUMENTS

| 4,516,646 | 5/1985 | Bergfalk | 73/862.66 X |
| 4,554,987 | 11/1985 | Dillon | 177/DIG. 9 |
| 4,581,948 | 4/1986 | Reichow | 73/862.65 |
| 4,666,003 | 5/1987 | Reichow | 73/862.66 X |

Primary Examiner—Charles A. Ruehl
Attorney, Agent, or Firm—Lowe, Price, LeBlanc, Becker & Shur

[57] ABSTRACT

A force measuring device of unitary design comprising a beam provided with force sensitive elements supported on a base plate by support elements at a closed distance, the support elements being housed in recesses provided at bottom surface of said beam and a top surface of said base plate. Since the support elements are integrated in said beam no separate support elements are necessary for supporting said force measuring device such that lateral forces are compensated.

12 Claims, 1 Drawing Sheet

FORCE MEASURING DEVICE

FIELD OF THE INVENTION

The invention relates to a force measuring device of the type of strain gauges.

BACKGROUND OF THE INVENTION

There are known force measuring devices or load cells comprising a relatively rigid body having regions of a reduced thickness where force sensitive elements are applied with upon exertion of forces respond to strain or shearing forces of the body by changing their electric characteristic. A typical example for such elements is a strain gauge. Other types of such elements are piezo-electric and piezo-resistive elements. In many applications of such load cells forces directed vertically onto such cells are to be exactly measured. However, usually the applied forces are not strictly vertical such that the load cell is loaded by force components in horizontal direction. These horizontal force components cause misreadings of the measurement; furthermore, there is a danger of damaging the load cell. Known load cells have relatively large height and an additional clearance is necessary for arranging supporting elements used for eliminating horizontal force components.

The UK Patent Application No. 2 145 831 discloses a self-aligning weighing platform which is supported by force-transmitting assemblies including a slider which is movable along a base surface. A rocker pin housed in generally cylindrical recesses at the bottom side of a load cell beam and in the slider transmits force therebetween. Using a specific method the weighing platform is self-aligned. the load cell beam is of a generally parallele piped from a retainer member being screwed to its bottom side embracing the slider for at least partial movement with the load cell beam. Thus, as mentioned before various separate elements are necessary to properly support the load cell beam.

The UK patent specification No. 1,049,151 discloses a force measuring instrument comprising a pair substantially parallel end plates seperated by at least three spaced columns which may be elastically compressed when a force is applied.

The German Patent Application Publication No. 22 57 009 discloses a device for introducing a force to a load cell using a specific force introduction member consisting of two support parts having generally plane opposing surfaces. Balls are inserted into spheric recesses provided in the opposing surfaces of the two support parts.

The German Patent Application Publication No. 25 46 890 relates to an assembly and protecting arrangement for load cells or weighing apparatuses using a rocker pin with rounded face surfaces bearing on plane surfaces of a base plate and of a weighing platform.

DISCLOSURE OF THE INVENTION

It is an object of the present invention to alleviate the drawbacks of the known force measuring devices.

It is a particular object of the present invention to simplify the design of a force measuring device.

It is a further object of the present invention to minimize manufacturing costs by reducing the number of parts and their shape.

It is another object of the present invention to provide an extremely compact force measuring device having a small height and being insensitive for lateral forces.

These and other objects are achieved by a force measuring device comprising:

a beam including a body provided with force-sensitive means responsive to strain or shearing forces exerted onto said beam, an upper surface of said beam being formed for force-introduction to said beam and bottom surface of said beam having formed therein recesses at outward regions of said beam;

a base plate having a top surface in parallel to said bottom surface of said beam and being provided with recesses aligned to corresponding of said recesses provided at said bottom surface of said beam; and support elements loosely fitting into said recesses in said bottom surfaces of said beam and said top surface of said base plate, having opposite curved surfaces for engaging bottom surfaces of said recesses and having a size adapted to maintain a relatively small gap between said bottom surface of said beam and said top surface of said base plate, the arrangement being such that a unitary force measuring device is formed with lateral force components being compensated by restoring forces caused by said support elements being rocked to a slanted position by said lateral force components and an excess lateral movement of said beam relative to said base plate being limited by a restricted skewing of said support element in said recesses.

The force measuring device according to the invention has the following advantages:

By integrating the movable support elements results in a very compact device having low height. In view of the small number and the simple design of the used parts the costs for material and manufacture are low; nevertheless a high accuracy may be achieved.

The assembly of the force measuring device according to the invention is no problem in many applications. The design according to the invention permits a series arrangement of several force measuring cells with different operating loads. In particular, the affect of lateral forces on the measuring result is considerably reduced, since the force measuring cell allows a horizontal movement causing a restoring force dependent on the selective forming of the support elements. Further features and advantages of the present invention will be apparent from the following description of embodiments with reference to the drawings.

BEST MODE OF CARRYING OUT THE INVENTIONS

Figure 1:
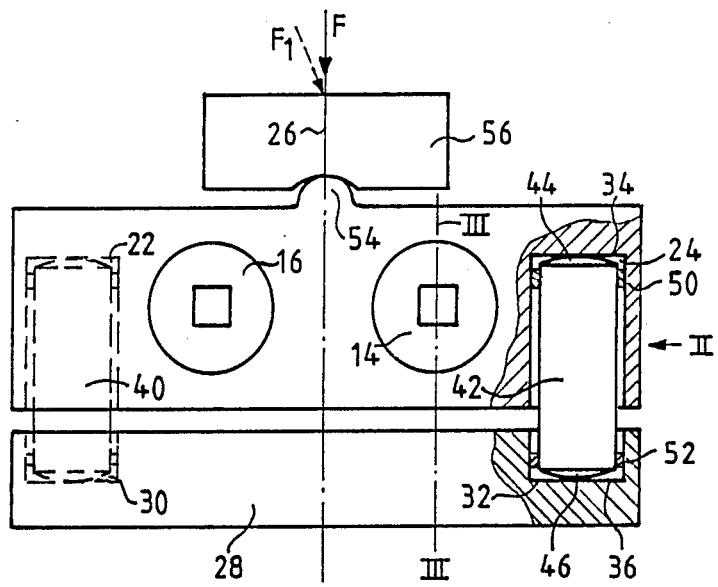
FIG. 1 is a side view of one embodiment of the force measuring device according to the invention partially in section.
Figure 2:
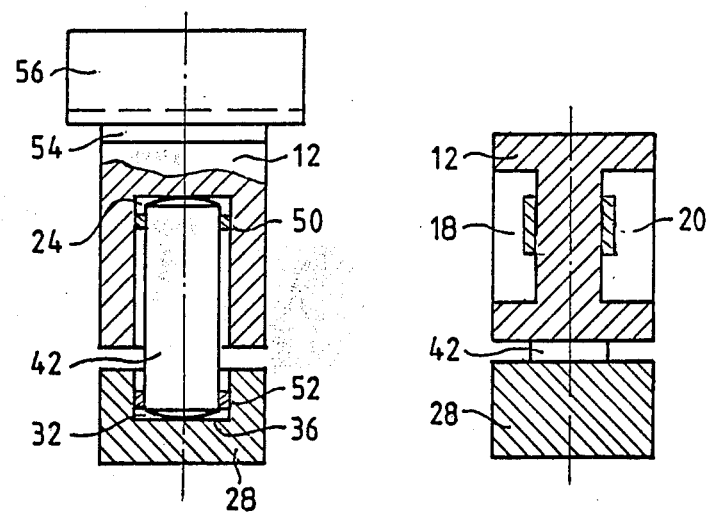
FIG. 2 is a view of the device according to FIG. 1 in the direction of arrow II in FIG. 1.
Figure 3:
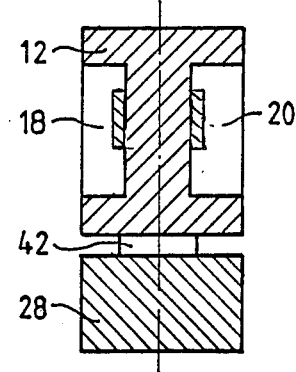
FIG. 3 is a sectional view along the line III—III in FIG. 1.

The FIGS. 1 to 3 show a exemplary embodiment of a force measuring device 10 according to the invention having a relatively rigid central body 12 having regions 14, 16 of considerably reduced thickness such that in sectional view according to FIG. 3 the central body 12, which has generally the shape of a rectangular parallelepiped, has a double-T-shape cross section. Force measuring elements exemplary strain gauge strips 18, 20 are applied to the vertical surfaces of the regions 14, 16, which strips in a known manner are electrically connected to a Wheatstone bridge circuit.

The support or bearing of the central body 12 is one important feature of the present invention. The central body 12 having the above mentioned elongated parallelepiped form is provided, at its bottom side with two preferably cylindrical holes 22, 24 which are equally spaced in opposition to the axis of symmetry 26 of the force measuring device. In respect of this axis 26 the holes 22, 24 are located adjacent to the opposite side faces of the central body 12 whilst the regions 14 and 16 are provided between the two holes 22, 24 within the central body 12 at equal distances from the axis 26 of symmetry and closer to this axis than the holes 22, 24.

A base plate 28 is provided with holes 30, 32 corresponding and aligned to the two holes 22, 24. The holes 22, 24, 30 and 32 preferably have a plane horizontal bottom, for instance the hole 24 a bottom 34 and hole 32 a bottom 36.

According to the invention the central body 12 is supported on the base plate 28 by cylindrical support elements 40, 42 the diameter of which is somewhat smaller than that of the holes, e.g. 24, such that there is a considerably loose of the support elements in the holes. The difference in diameter may be in the range of several millimeters up to more than one centimeter.

The length of the support elements 40, 42 is selected such that in a vertical position thereof there is small distance between the bottom side of the central body 12 and the top side of the base plate 28 which distance may be in the range of one or several millimeters.

It should be noted that preferably the holes 22, 24 in the central body 12 are formed considerable deeper than the holes 30, 32 in the base plate 28; thus, the latter may be made of relatively low height whilst the depth of the holes 22, 24 does not remarkably affect the height of the central body 12.

Another feature important for the force measuring device according to the invention is the outwardly curved shape of the upper and lower face surface 44 and 46 of the support elements 40, 42. The curvatures of these spherical surfaces 40, 46 are selected dependent on the lateral load to be expected and the desired restoring force, as it will be explained below. In particular, the radius of curvature may be in the range of the height of the support elements 40, 42.

In order to centre the support elements 40, 42 the bottom surfaces opposite thereto may be spherically curved in the same direction, however with a larger radius of curvature; in this case the restoring force to be selected is influenced by the difference between the radii of curvature of the two spherically curved surfaces.

With a further embodiment of the invention a ring 50 and 52, respectively, may be arranged adjacent to the upper and lower face edge of the support elements 40, 42. The rings 50, 52 fit well between the cylindrical surfaces of the support elements 40, 42 and of the holes 22, 24 and are preferably elastic serving a sealing and centering of the support elements 40, 42.

For introducing a force at the top side of the central body 12 the top surface thereof is provided with a specific force introduction means. With a first embodiment this force introduction means according to FIG. 1 is in the form of a projecting ledge 54 rounded at the top, i.e. of semi-circular cross-section. This ledge extends centrally and laterally to the longitudinal direction of the central body 12. Thus it is arranged symmetrically to the force measuring elements 18, 20 and the support elements 40, 42.

The ledge 54 of FIG. 1 may be replaced by a corresponding recess in which a cylindrical rod is provided. In both cases the upper side of the ledge or the rod is engaged by a curved recess provided at the bottom side of a force introduction element. Alternatively, the rod may be replaced by two spaced balls. A further embodiment of a force introduction means may have the shape of a curved recess at the upper surface of the central body 12 opposing a longitudinal ledge provided at the bottom surface of the force introduction element.

The force measuring device according to the invention as explained above operates as follows:

With a vertical force F acting in the direction of the axis 26 of symmetry onto the force introduction element 56 there is neither a canting or tilting nor a lateral loading of the central body 12; thus, this force F causes a symmetrical loading of the central body 12 and the force F can be determined in dependence on the strain exerted onto the strain gauge strips 18, 20.

If a force $F_1$ acts on the force introduction element 56 in an oblique direction the horizontal component of this force causes an offsetting of the central body 12 to the right (FIG. 1) the spheric face surfaces 44, 46 rolling on the bottoms 34 and 36, respectively. Thereby, the support elements 40, 42 are brought into a slightly inclined position. Due to the curvature of the spheric face surfaces 44, 46 a restoring force is developed the strength of which is particularly determined by the degree of curvature, the offsetting and the vertical force. The horizontal force component causes a horizontal movement of the central body 12 until the developping restoring force equals the horizontal force component; then the desired vertical component is correctly determined by the strain gauge strips 18, 20. As soon as the horizontal force component is removed the device restores into its home position.

In horizontal direction the movement of the central body 12 is limited by the fact that the support elements 40, 42 in their associated holes 22, 24, 30, 32 in cooperation with the elastic rings 50, 52 form an elastic abutment limiting the horizontal shift of the central body 12.

It should be noted that the spheric face surfaces 44, 46 of the support element 40, 42 may be replaced by cylindrical surfaces in case the restoring force shall be dependent on the direction of offset movement.

With an alternative embodiment the force introduction means may be designed point-like using a ball and corresponding spheric recesses in the top surface of the central body 12 and the bottom surface of the force introduction element 56. Such an arrangement may be applicable for a measuring system being formed rotational symmetrically. With such a design three support elements may be used arranged on a circle at an angular distance of 120°.

I claim:
1. A force measuring device comprising:
 a beam including a body provided with force sensitive means responsive to strain or shearing forces exerted onto said beam, an upper surface of said beam being formed for force introduction to said beam and a bottom surface of said beam having formed therein recesses at outward regions of said beam;

a base plate having a top surface in parallel to said bottom surface of said beam and being provided with recesses aligned to corresponding of said recesses provided at said bottom surface of said beam; and support elements loosely fitting into said recesses in said bottom surface of said beam and said top surface of said base plate, having opposite curved surfaces for engaging bottom surfaces of said recesses and having a size adapted to maintain a relatively small gap between said bottom surface of said beam and said top surface of said base plate, the arrangement being such that a unitary force measuring device is formed with lateral force components being compensated by restoring forces caused by said support elements being rocked to slanted position by said lateral force components and an excess lateral movement of said beam relative to said base plate being limited by a restricted skewing of said support elements in said recesses.

2. The force measuring device of claim 1 wherein said recesses are of generally cylindrical shape.

3. The force measuring device of claim 2 wherein a diameter of said cylindrical recesses is in the range of 70 to 90% of a diameter of said support elements, a height of said support elements being in the range of two to three times of their diameters.

4. The force measuring device of claim 1 wherein said recesses in said bottom surface of said beam have a remarkably larger height than said recesses in said top surface of said base plate.

5. The force measuring device of claim 1 wherein said force-sensitive means and said support elements are arranged symmetrically to a vertical plane through said beam, said force-sensitive elements being arranged closer to said plane than said support elements.

6. The force measuring device of claim 1 wherein adjacent to each said curved opposed surface of said support elements an elastic ring is provided, said elastic ring sealing and centering said support element.

7. The force measuring device of claim 1 wherein said force-sensitive means and said support elements are symmetrically arranged about a central vertical axis extending in a direction of force application onto said beam, said force sensitive means being arranged closer to said axis than said support elements.

8. The force measuring device of claim 1 wherein said gap between said bottom surface of said beam and said top surface of said base plate is in the range of one millimeter to one centimeter.

9. The force measuring device of claim 1 wherein surfaces in said recesses engaging said opposed curved surfaces of said support elements are curved in the same sense as but less than said opposed curved surfaces of said support elements.

10. The force measuring device of claim 1 wherein said beam, said base plate and said support elements are made of stainless steel.

11. The force measuring device of claim 1 wherein said upper surface of said beam has mounted thereon a force introduction member by means of a bearing permitting tilting of said force introduction member in respect of a horizontal plane.

12. A force measuring device comprising:

a beam including a body provided with force sensitive means responsive to strain or shearing forces exerted onto said beam, an upper surface of said beam being formed for force introduction to said beam and a bottom surface of said beam having formed therein cylindrical recesses at outward regions of said beam;

a base plate having a top surface in parallel to said bottom surface of said beam and being provided with cylindrical recesses aligned to corresponding of said cylindrical recesses provided at said bottom surface of said beam; and cylindrical support elements loosely fitting into said cylindrical recesses in said bottom surface of said beam and said top surface of said base plate, having opposite curved surfaces for engaging bottom surfaces of said cylindrical recesses and having a size adapted to maintain a relatively small gap between said bottom surface of said beam and said top surface of said base plate, the arrangement being such that a unitary force measuring device is formed with lateral force components being compensated by restoring forces caused by said cylindrical support elements being rocked to slanted position by said lateral force components and an excess lateral movement of said beam relative to said base plate being limited by restricted skewing of said cylindrical support elements in said cylindrical recesses, wherein said cylindrical recesses in said bottom surface of said beam having a remarkably larger height than said cylindrical recesses in said top surface of said base plate.

* * * * *